May 9, 1933.  J. C. MINOR  1,908,164

METHOD OF SUPPLYING CARBON DIOXIDE FOR AIDING THE GROWTH OF PLANTS

Filed May 12, 1931

INVENTOR
John C. Minor
BY
ATTORNEY

Patented May 9, 1933

1,908,164

UNITED STATES PATENT OFFICE

JOHN C. MINOR, OF NEW CANAAN, CONNECTICUT, ASSIGNOR TO WILLIAM WHARTON JR. & COMPANY, INCORPORATED, OF EASTON, PENNSYLVANIA, A CORPORATION OF PENNSYLVANIA

METHOD OF SUPPLYING CARBON DIOXIDE FOR AIDING THE GROWTH OF PLANTS

Application filed May 12, 1931. Serial No. 536,796.

This invention relates to methods of enriching the carbon dioxide content of the atmosphere in proximity to growing plants to increase the rate of growth of the latter.

The invention aims to provide a simple and highly efficient method of supplying the carbon dioxide to such atmosphere, especially in hothouses or enclosed spaces, where wind will not blow the carbon dioxide away as fast as it is liberated.

The ideal method would be to have the desired high carbon dioxide atmosphere only around the leaves of the plants to reduce the wastage of carbon dioxide to a minimum. I have found that these ideal conditions may be approached by introducing, preferably at a point or points a short distance above the top of the foliage, gas high in carbon dioxide and at considerably lower temperature than the average atmospheric temperature of the hothouse. Carbon dioxide is heavier than air. Further, a cold gas is heavier than the same gas at a higher temperature. Hence, cold carbon dioxide gas, or gas high in carbon dioxide, when liberated above the foliage will fall and in so falling spread over and between the leaves of the plants and produce a layer of air relatively high in carbon dioxide throughout the lower part of the hothouse. In this way the carbon dioxide content of the atmosphere between and around the foliage may be raised to a desired percentage, desirably about 0.3% or more, without raising the carbon dioxide content at higher levels to the same degree.

The invention comprises a method of so supplying the cold carbon dioxide gas, or gas high in carbon dioxide, by allowing solid carbon dioxide to vaporize under atmospheric pressure in suitable containers open to the atmosphere. The rate of vaporization is determined by the rate of absorption of external heat by the container and its contents, and may be predetermined by the form, size and construction of the container.

Solid carbon dioxide has several advantages over liquid carbon dioxide as a source of gaseous carbon dioxide. It is much more easily handled. It can be cut or broken into lumps of the desired size, and these lumps can be readily inserted into the containers. Liquid carbon dioxide must be kept in drums under a pressure around 750 to 800 lbs. per sq. in., and these drums are clumsy to handle and it is difficult to control the discharge of the gas therefrom.

Increase in concentration of carbon dioxide increases plant growth within certain limits, the increment of plant growth for any given increase in carbon dioxide concentration falling off as the total carbon dioxide concentration rises above a certain optimum amount until it becomes unprofitable to increase the concentration any further. Carbon dioxide is effective in promoting plant growth only in sunlight, plants being unable to assimilate it in the dark. The charging of the hothouse atmosphere with carbon dioxide should, therefore, be started in the morning.

After a given charge of carbon dioxide has been liberated in the air in the hothouse, its concentration tends to fall off, due to absorption of carbon dioxide by the foliage and by the moisture of the soil and, also, to diffusion into the air in the upper part of the hothouses, losses through ventilators, etc. As far as practicable the concentration should be maintained for a suitable length of time at or around the point of maximum efficiency, i. e., the point at which increased cost of carbon dioxide balances increased value of the products of the hothouse. The discharge of carbon dioxide should most desirably be rapid at first to bring the concentration up to the desired point and then slow thereafter to compensate for losses.

A satisfactory approximation to the above ideal condition is obtained by my method by allowing solid carbon dioxide to evaporate in open topped metal containers having a comparatively large heat absorbing surface and sufficient thickness to allow of ready flow of heat from all parts of the heat absorbing surface of the container to the parts of the latter in contact with the solid carbon dioxide. Tests with containers of this type have shown that the rate of evaporation of carbon dioxide during the first thirty minutes is two to four times the rate of evaporation after three hours. The size and form of the container and the charge of solid carbon dioxide therefor should best be such that evaporation is about 75% complete at the end of three or four hours, so that while the concentration is maintained during the forenoon and early part of the afternoon it is allowed to taper off in the latter part of the daylight hours.

One convenient arrangement for carrying out the invention is shown in the accompanying drawing, wherein.

Figure 1:
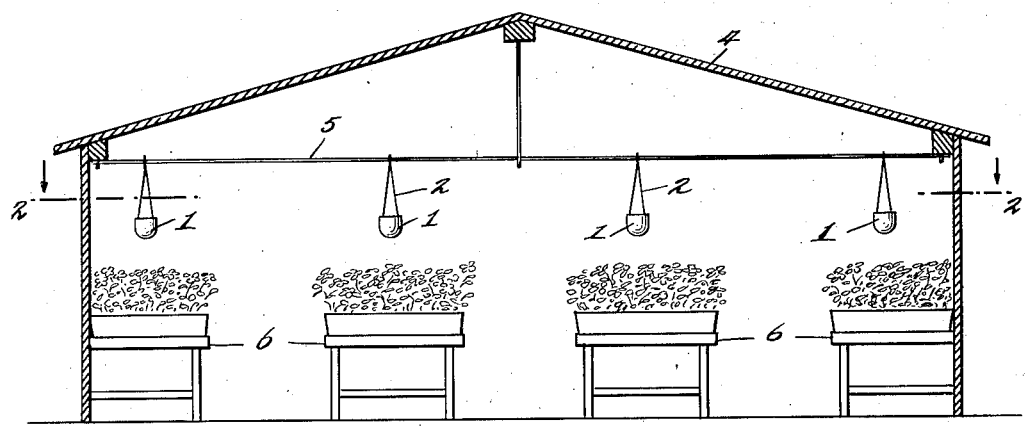
Fig. 1 is a diagrammatic vertical transverse section of a hothouse equipped with means to supply carbon dioxide according to my method.
Figure 2:
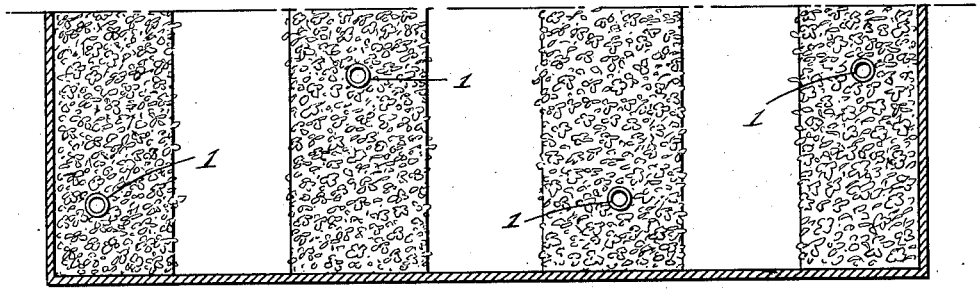
Fig. 2 is a section on the line 2—2 of Fig. 1.
Figure 3:
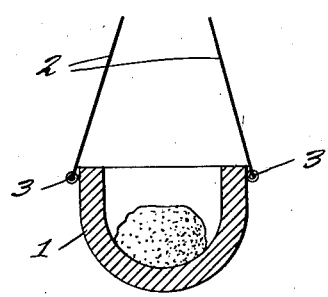
Fig. 3 is a vertical section through one of the containers for solid carbon dioxide.

The containers 1 are of heavy metal construction, desirably, cast iron cups, provided with rings 3 or the like for attachment of wires 2 by which the cups are suspended from a suitable part of the roof construction of the hothouse. As shown, the roof of the hothouse 4 is provided with cross-stays 5 which form convenient means for supporting the cups. Suspension of the cups 1 from the roof is preferable to supporting them by tripods or uprights on the benches 6 as the latter are thereby left clear of all obstructions. Further, when suspended, the height of the cups above the foliage may be adjusted more readily than in the case where rigid supports are provided.

A suitable size of cup is about 5 inches in diameter and 4 or 5 inches or more in height with walls about ¼ inch thick. The cups are to advantage suspended 1 to 2 feet above the top of the foilage. The cups are desirably distributed along the benches in staggered arrangement and at such distances apart that there is one cup for about each 500 square feet of floor area. With this ratio between the number of cups and the floor area a suitable charge of solid carbon dioxide for each cup is about 1½ lbs.

What is claimed is:

1. Method of enriching the carbon dioxide content of the atmosphere in the neighborhood of growing plants, which comprises supplying carbon dioxide gas by allowing solid carbon dioxide to vaporize under atmospheric pressure in a container arranged above the tops of the foliage.

2. Method of enriching the carbon dioxide content of the atmosphere in the neighborhood of growing plants, which comprises supplying carbon dioxide gas at a gradually decreasing rate by allowing solid carbon dioxide to vaporize in a container open to the atmosphere.

3. Method of enriching the carbon dioxide content of the atmosphere in the neighborhood of growing plants, which comprises supplying carbon dioxide gas by allowing solid carbon dioxide to vaporize in a plurality of containers open to the atmosphere arranged above the soil in which the plants are growing and substantially uniformly separated from each other.

4. Apparatus for enriching the carbon dioxide content of the atmosphere in the neighborhood of growing plants, comprising a plurality of containers for solid carbon dioxide open to the atmosphere arranged above the soil in which the plants are growing and substantially uniformly separated from each other, the ratio between the area of ground treated to the number of containers being of the order of magnitude of one container for each 500 square feet of floor area.

5. Apparatus for enriching the carbon dioxide content of the atmosphere in the neighborhood of growing plants, comprising a container for solid carbon dioxide formed of metal of substantial thickness to allow ready flow of heat from all parts of the surface of such container to the parts of the latter in contact with the solid carbon dioxide.

6. The method of enriching the carbon dioxide content of the atmosphere in the neighborhood of growing plants which comprises allowing solid carbon dioxide to vaporize in a container, the rate of vaporization being determined by the rate of absorption of external heat by the container and its contents.

In testimony whereof, I have hereunto set my hand.

JOHN C. MINOR.